US012593019B2

(12) United States Patent
Takemoto

(10) Patent No.: US 12,593,019 B2
(45) Date of Patent: Mar. 31, 2026

(54) INFORMATION PROCESSING APPARATUS USING PARALLAX IN IMAGES CAPTURED FROM A PLURALITY OF DIRECTIONS, METHOD AND STORAGE MEDIUM

(71) Applicant: CANON KABUSHIKI KAISHA, Tokyo (JP)

(72) Inventor: Kazuki Takemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 18/064,689

(22) Filed: Dec. 12, 2022

(65) Prior Publication Data

US 2023/0188692 A1     Jun. 15, 2023

(30) Foreign Application Priority Data

Dec. 14, 2021     (JP) ................................. 2021-202355

(51) Int. Cl.
| | |
|---|---|
| *H04N 13/128* | (2018.01) |
| *G06T 7/55* | (2017.01) |
| *G06V 10/74* | (2022.01) |
| *H04N 23/695* | (2023.01) |

(52) U.S. Cl.
CPC ............. *H04N 13/128* (2018.05); *G06T 7/55* (2017.01); *G06V 10/761* (2022.01); *H04N 23/695* (2023.01); *G06T 2207/10028* (2013.01)

(58) Field of Classification Search
CPC .. H04N 13/128; H04N 23/695; H04N 13/239; H04N 2013/0081; G06T 7/55; G06T 2207/10028; G06T 2207/10012; G06T 7/593; G06V 10/761

USPC .............................. 382/154; 348/47; 345/419
See application file for complete search history.

(56) References Cited

U.S. PATENT DOCUMENTS

| | | | |
|---|---|---|---|
| 8,471,898 B2 * | 6/2013 | Neuman | H04N 13/261 |
| | | | 348/222.1 |
| 11,127,148 B1 * | 9/2021 | Edmonds | H04N 13/128 |
| 2004/0136706 A1 * | 7/2004 | Takahashi | H04N 23/81 |
| | | | 396/281 |

(Continued)

FOREIGN PATENT DOCUMENTS

| | | |
|---|---|---|
| JP | 2012058188 A | 3/2012 |
| JP | 2016052114 A | 4/2016 |
| JP | 2019113434 A | 7/2019 |

*Primary Examiner* — Kathleen Y Dulaney
(74) *Attorney, Agent, or Firm* — Canon U.S.A., Inc. IP Division

(57) ABSTRACT

An information processing apparatus includes a processor and a memory coupled to the processor and storing instructions that, when executed by the processor, cause the processor to function as an image acquisition unit, an index detection unit, a correction unit, and a determination unit. The image acquisition unit is configured to acquire images captured by an image capturing unit configured to perform image capturing from a plurality of directions. The index detection unit configured to detect information about an index appearing on the acquired images. The correction unit is configured to determine a correction to: (1) correct a depth value calculated from parallax in the acquired images, or (2) correct the parallax, based on the detected information. The determination unit is configured to determine whether to execute the correction based on a state of the index appearing on one of the acquired images.

8 Claims, 14 Drawing Sheets

(56) References Cited

U.S. PATENT DOCUMENTS

| | | | |
|---|---|---|---|
| 2010/0086222 A1* | 4/2010 | Shimizu | H04N 19/103 |
| | | | 382/232 |
| 2012/0069004 A1* | 3/2012 | Takama | H04N 13/122 |
| | | | 345/419 |
| 2012/0140043 A1* | 6/2012 | Mori | H04N 23/62 |
| | | | 348/47 |
| 2013/0071013 A1* | 3/2013 | Ogata | G06T 7/593 |
| | | | 382/154 |
| 2013/0100254 A1* | 4/2013 | Morioka | H04N 13/133 |
| | | | 348/47 |
| 2013/0107014 A1* | 5/2013 | Masuda | H04N 13/239 |
| | | | 348/47 |
| 2014/0063199 A1* | 3/2014 | Kim | G06T 7/593 |
| | | | 348/47 |
| 2014/0232830 A1* | 8/2014 | Ichige | H04N 13/239 |
| | | | 348/47 |
| 2014/0293006 A1* | 10/2014 | Masuda | H04N 13/128 |
| | | | 348/43 |
| 2016/0295194 A1* | 10/2016 | Wang | A61B 1/00057 |
| 2019/0102898 A1* | 4/2019 | Tanabe | H04N 13/128 |
| 2021/0123870 A1* | 4/2021 | Mahajan | H01M 10/488 |
| 2021/0160441 A1* | 5/2021 | Bleyer | H04N 5/265 |
| 2021/0334991 A1* | 10/2021 | Lee | G01S 17/42 |
| 2022/0335637 A1* | 10/2022 | Price | G06T 7/593 |
| 2023/0027389 A1* | 1/2023 | Hu | G06V 10/242 |
| 2023/0096626 A1* | 3/2023 | Gomita | G06V 10/761 |
| | | | 348/362 |

* cited by examiner

FIG. 1A

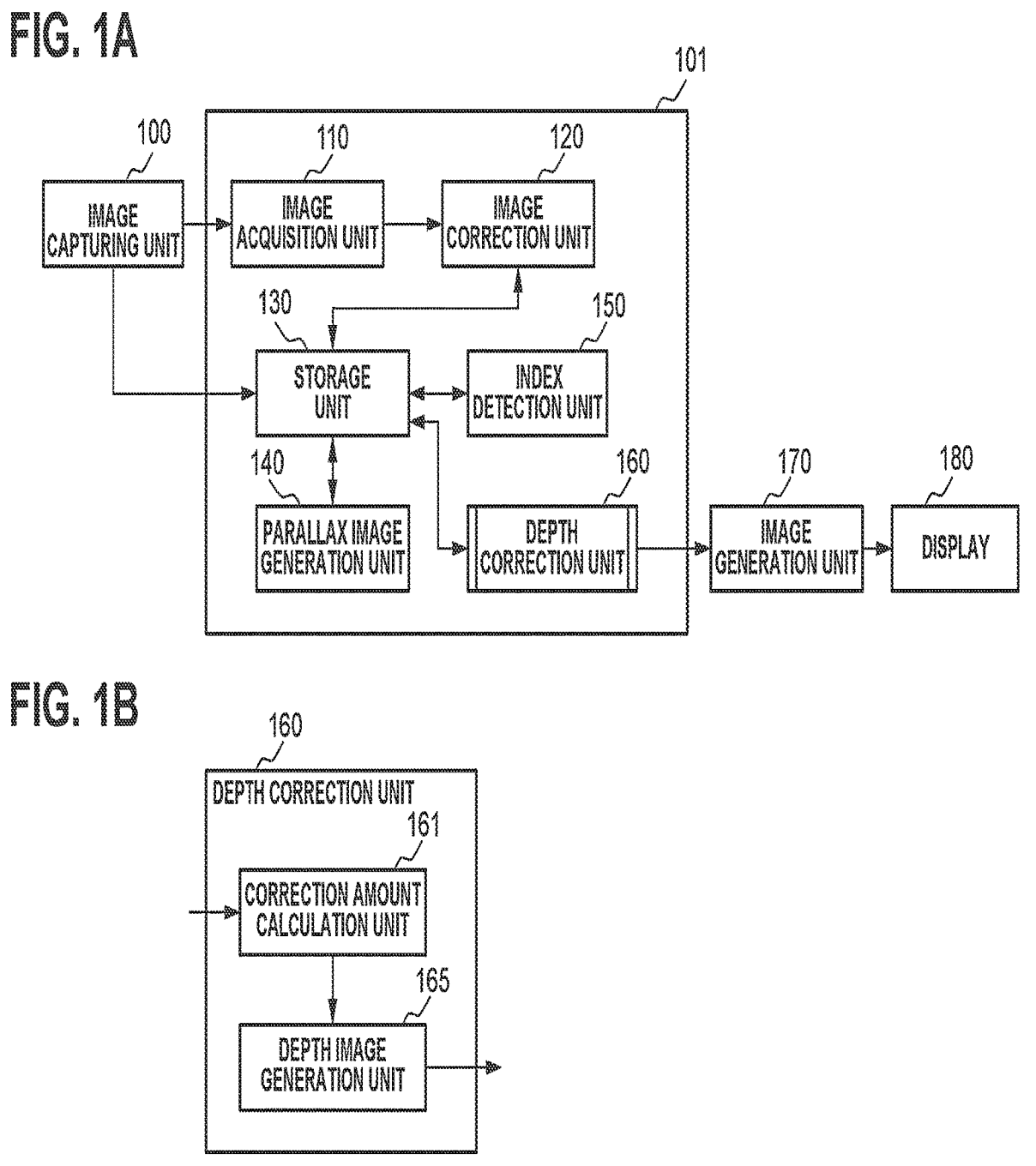

```
                                                              ┌─ 101
                    ┌─ 100          ┌─ 110          ┌─ 120
┌──────────────┐   ┌──────────────┐   ┌──────────────┐
│    IMAGE     │──▶│    IMAGE     │──▶│    IMAGE     │
│CAPTURING UNIT│   │ACQUISITION   │   │CORRECTION    │
│              │   │   UNIT       │   │   UNIT       │
└──────────────┘   └──────────────┘   └──────────────┘
```

IMAGE CAPTURING UNIT

IMAGE ACQUISITION UNIT

IMAGE CORRECTION UNIT

STORAGE UNIT

INDEX DETECTION UNIT

PARALLAX IMAGE GENERATION UNIT

DEPTH CORRECTION UNIT

IMAGE GENERATION UNIT

DISPLAY

DEPTH CORRECTION UNIT

161

CORRECTION AMOUNT CALCULATION UNIT

165

DEPTH IMAGE GENERATION UNIT

INFORMATION PROCESSING APPARATUS USING PARALLAX IN IMAGES CAPTURED FROM A PLURALITY OF DIRECTIONS, METHOD AND STORAGE MEDIUM

BACKGROUND

Technical Field

One disclosed aspect of the embodiments relates to an information processing apparatus that processes information about an image captured by an image capturing unit that captures images from a plurality of directions, a method, and a storage medium.

Description of the Related Art

In performing typical measurement of a depth of a scene captured by a stereo camera, camera parameters sometimes change at that time. The camera parameters include external camera parameters, such as a relative position and orientation between stereo cameras and internal camera parameters, such as a focal length and a principal point position of each stereo camera. An influence of a variation in camera parameters leads to the occurrence of an error in a calculated depth value of a scene, resulting in failure to obtain a highly accurate depth value.

Japanese Patent Application Laid-Open No. 2019-113434 (hereinbelow, referred to as first patent literature) discusses a technique for calibrating a deviation caused by an installation state of a stereo image capturing apparatus.

Japanese Patent Application Laid-Open No. 2012-058188 (hereinbelow, referred to as second patent literature) discusses a technique for calibrating a parameter related to positions of two imaging devices, and the parameter is set in a distance measurement system that is installed in a mobile object and performs distance measurement with the imaging devices.

According to the first patent literature, a variation in a camera parameter of a stereo camera is recalculated by calculating the effective number of pixels of parallax (intermediate data before calculating a depth value) of each acquired pixel and correcting the camera parameter if calibration is to be made. It is determined whether the effective number of pixels increases by the recalculation, and the dynamically varied camera parameter is corrected by adjusting the camera parameter until the effective number of pixels exceeds a predetermined threshold value.

However, according to the first patent literature, calculation is repeated until the effective number of pixels exceeds the predetermined threshold value, so that output of the depth value is stopped at the time of recalculation.

According to the second patent literature, a stereo camera mounted on the mobile object captures images at two points, and a correction value for the parameter related to the positions of the imaging devices is calculated from parallax and parallax changing amounts.

However, according to the second patent literature, images are to be captured at two points, so that the correction value cannot be calculated in a stationary state.

SUMMARY

According to an aspect of the embodiments, an information processing apparatus includes a processor and a memory coupled to the processor and storing instructions that, when executed by the processor, cause the processor to function as an image acquisition unit, an index detection unit, a correction unit, and a determination unit. The image acquisition unit is configured to acquire images captured by an image capturing unit configured to perform image capturing from a plurality of directions. The index detection unit is configured to detect information about an index appearing on the acquired images. The correction unit is configured to determine a correction to: (1) correct a depth value calculated from parallax in the acquired images, or (2) correct the parallax, based on the detected information. The determination unit is configured to determine whether to execute the correction based on a state of the index appearing on one of the acquired images.

Further features of the disclosure will become apparent from the following description of exemplary embodiments with reference to the attached drawings.

BRIEF DESCRIPTION OF THE DRAWINGS

FIG. 1A illustrates a functional configuration of an image capturing system according to a first exemplary embodiment. FIG. 1B illustrates a functional configuration of a depth correction unit according to the first exemplary embodiment.

DESCRIPTION OF THE EMBODIMENTS

Figures 2A, 2B:
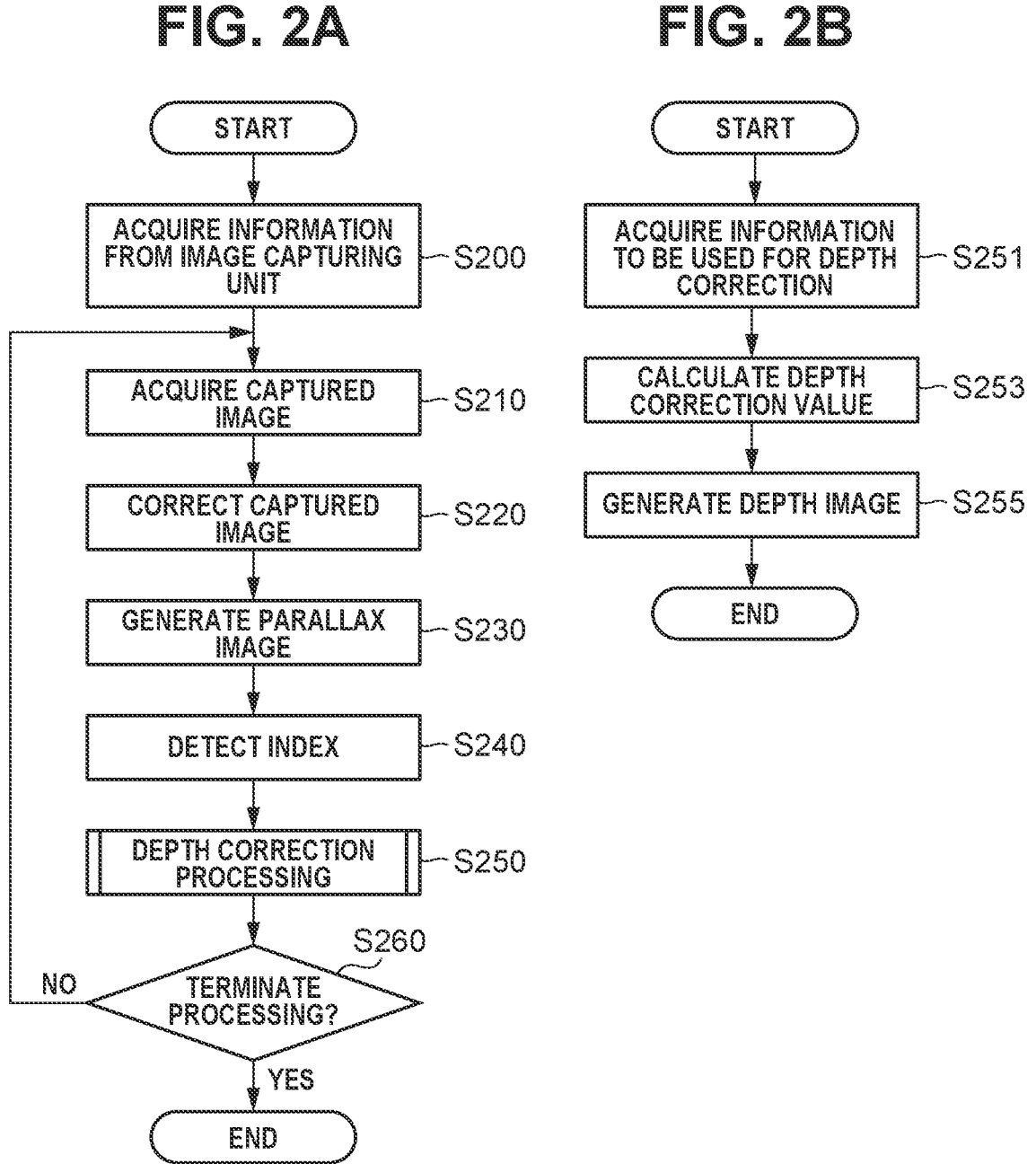
FIG. 2A is a flowchart illustrating processing to be executed by an information processing apparatus according to the first exemplary embodiment.
FIG. 2B is a flowchart illustrating depth correction processing according to the first exemplary embodiment.

Various exemplary embodiments of the disclosure will be described in detail below with reference to the accompanying drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

A first exemplary embodiment will be described. FIGS. 1A and 1B are diagrams each illustrate a configuration of an image capturing system according to the first exemplary embodiment. FIG. 1A illustrates a functional configuration of the image capturing system, and FIG. 1B illustrates a functional configuration of a depth correction unit 160 in an information processing apparatus 101.

As illustrated in FIG. 1A, the image capturing system includes an image capturing unit or circuit 100, the information processing apparatus 101, an image generation unit or circuit 170, and a display 180. The configuration illustrated in FIG. 1A is an example, and the disclosure is not limited to this configuration. For example, the image capturing unit 100 may be configured as an image capturing apparatus independent of the information processing apparatus 101, or the image capturing unit 100 and the information processing apparatus 101 may be integrated. A function of the information processing apparatus 101 may be implemented by a plurality of apparatuses, or the information processing apparatus 101 may include the image generation unit 170.

The image capturing unit 100 captures images from a plurality of directions, and, for example, a stereo camera including two fixed cameras that capture a scene is used. If a scene to be image-captured does not spatially change, the disclosure can also be applied with a method for measuring a position and an orientation of a single camera and performing stereo measurement from images captured from a plurality of directions.

The information processing apparatus 101 includes an image acquisition unit or circuit 110, an image correction unit or circuit 120, a storage unit or circuit 130, a parallax image generation unit or circuit 140, an index detection unit or circuit 150, and the depth correction unit or circuit 160.

The image acquisition unit 110 acquires an image captured by the image capturing unit 100 and outputs the acquired image to the image correction unit 120. The image acquisition unit 110 is an example of an image acquisition unit according to the disclosure.

The image correction unit 120 performs lens distortion correction and rectification for high-speed processing of a stereo camera image as correction processing on the image acquired by the image acquisition unit 110. The image correction unit 120 reads a camera parameter to be used for the correction processing from the storage unit 130. For the lens distortion correction and the rectification, methods described in the first patent literature and the second patent literature, and other known techniques can be used. The image correction unit 120 stores the image having been subjected to the correction processing (referred to as a corrected camera image in the present exemplary embodiment) in the storage unit 130.

The storage unit 130 is a module for storing and managing various types of information. The storage unit 130 stores, for example, the following information.

The corrected camera image (left and right images in a case of a twin-lens stereo camera)

The camera parameters (external camera parameters, such as a relative position and orientation between the stereo cameras, and internal camera parameters, such as a focal length and a principal point position of each stereo camera)

A parallax image generated by the parallax image generation unit 140

Index information (information input by a user in advance, such as identification (ID) as identification information for an index and lengths of sides of a rectangular area)

Index detection information detected by the index detection unit 150 (the ID of the index and coordinate values <X value, Y value> of vertices of the rectangular area of each index)

Past index detection information (e.g., the index detection information of last ten frames)

Regarding the camera parameters, the storage unit 130 stores the camera parameters that are read at the time of initialization and stored in the image capturing unit 100. In a case where the image capturing unit 100 does not include the camera parameters, the image capturing unit 100 may image-capture a calibration pattern for camera calibration in advance and calculate the camera parameters from image data.

The information stored in the storage unit 130 is not limited to the one having a data structure described above as long as the information to be used for processing in each block is stored.

The parallax image generation unit 140 calculates parallax in the corrected camera image based on the corrected camera image and the camera parameters stored in the storage unit 130 and generates a parallax image.

The parallax image may be generated using a method for matching images acquired by the stereo cameras block by block to calculate the parallax for each pixel (Sum of Absolute Difference method, or the like) as described in the first patent literature and the second patent literature. The parallax image generation unit 140 stores the generated parallax image in the storage unit 130.

The index detection unit 150 detects information about the index appearing on the corrected camera image stored in the storage unit 130 (referred to as the index detection information in the present exemplary embodiment) and stores the index detection information in the storage unit 130. The index detection unit 150 is an example of an index detection unit according to the disclosure.

Figure 3:
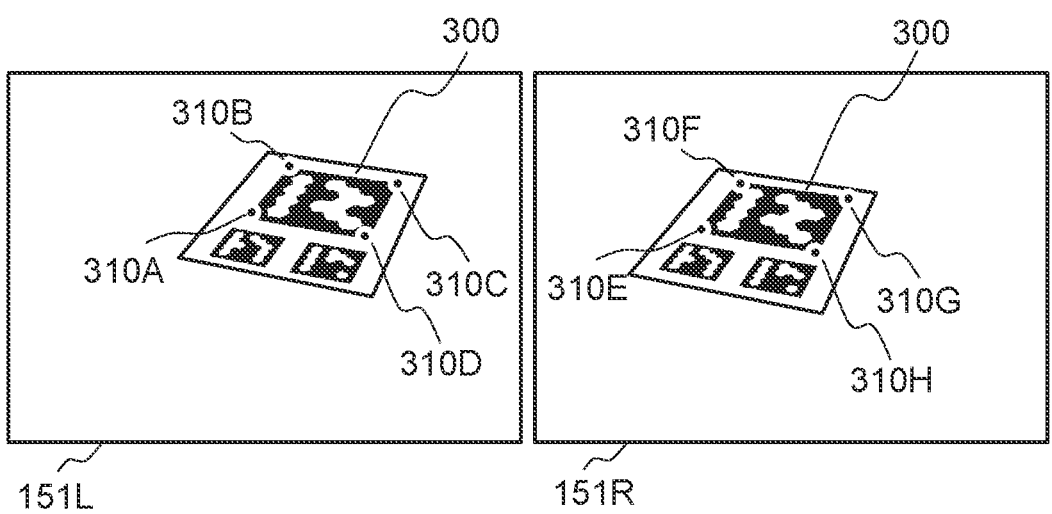
FIG. 3 illustrates a state in which indices appear on corrected camera images.

As the index, a marker with a rectangular area including a square is used as illustrated in FIG. 3. The index can be detected using processing for detecting a rectangular marker with an identifier (ID), such as ArUco. More specifically, a rectangular area is detected from the corrected camera image, a bit pattern arranged in the rectangular area is specified through homography transformation, and the ID and coordinate values of four vertices of the rectangular area are output. An example of index detection processing is described with reference to FIG. 3. An index 300 appears on each of the left and right images 151L and 151R, which are the corrected camera images, and the index detection unit 150 specifies coordinate values of four vertices of the rectangular area of the index 300. More specifically, the index detection unit 150 specifies coordinate values <X value, Y value> of four vertices 310A to 310D of the rectangular area of the index 300 detected in the left image 151L. The index detection unit 150 identifies coordinate values <X value, Y value> of four vertices 310E to 310H of the rectangular area of the index 300 detected in the right image 151R. The index detection unit 150 then stores the coordinate values of the four vertices 310A to 310D and the coordinate values of the four vertices 310E to 310H in the storage unit 130.

The index detection unit 150 sequentially determines whether the index appears on the corrected camera images that are acquired at regular intervals by the image acquisition unit 110 and corrected by the image correction unit 120. In a case where the index appears on the corrected camera image, the index detection unit 150 outputs the index detection information to the storage unit 130 to update the index detection information for a current frame. In a case where the index does not appear on the corrected camera image, the index detection unit 150 outputs information indicating that there is no index as the index detection information. In a case where a plurality of indices is detected in the same frame, the index detection unit 150 associates the coordinate values of the four vertices of the rectangular area with each ID of the detected index and stores them in the storage unit 130.

The depth correction unit 160 reads the parallax image stored in the storage unit 130 and corrects a depth value calculated from the parallax image. As illustrated in FIG. 1B, the depth correction unit 160 includes a correction amount calculation unit 161 and a depth image generation unit 165. The depth correction unit 160 is an example of a correction unit according to the disclosure.

The correction amount calculation unit 161 calculates a correction amount for correcting the depth value. Processing to be performed by the correction amount calculation unit 161 is described with reference to FIGS. 3 to 5.

Initially, the correction amount calculation unit 161 refers to the index detection information stored in the storage unit 130 and acquires the coordinate values of the vertices of the rectangular area of the index 300 in the corrected camera image. In a case where the left and right images 151L and 151R as illustrated in FIG. 3 have been acquired, the depth correction unit 160 associates the vertices 310A to 310D of the rectangular area of the index 300 with 310E to 310H of the rectangular area of the index 300 with the same ID in the left and right images 151L and 151R with each other. More specifically, the depth correction unit 160 associates the vertex 310A in the left image 151L with the vertex 310E in the right image 151R as the same point in a three-dimensional space. Similarly, the depth correction unit 160 associates the vertex 310D in the left image 151L with the vertex 310H in the right image 151R as the same point in the three-dimensional space. Here, only the vertices 310A and 310D will be described for the sake of simplification. In a case where a plurality of indices is detected in the same frame, the association is performed for each index.

Figure 4:
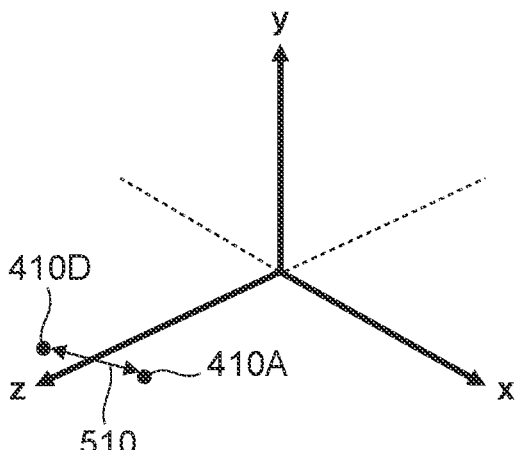
FIG. 4 illustrates three-dimensional points in a camera coordinate system.

If the corresponding points in the left and right images 151L and 151R (the vertices 310A and 310E, and the vertices 310D and 310H in FIG. 3) are associated with each other, three-dimensional points 410A and 410D in a camera coordinate system can be calculated using a known triangulation calculation method as illustrated in FIG. 4. The camera coordinate system is a coordinate system based on the camera, and a depth direction with respect to the image capturing unit 100 is defined as a Z direction. The correction amount calculation unit 161 calculates a distance between the points 410A and 410D (a length of a line segment 510 connecting the points 410A and 410D).

The correction amount calculation unit 161 refers to the index information stored in the storage unit 130 and acquires lengths of sides of the rectangular area of the index with the corresponding ID.

Figure 5:
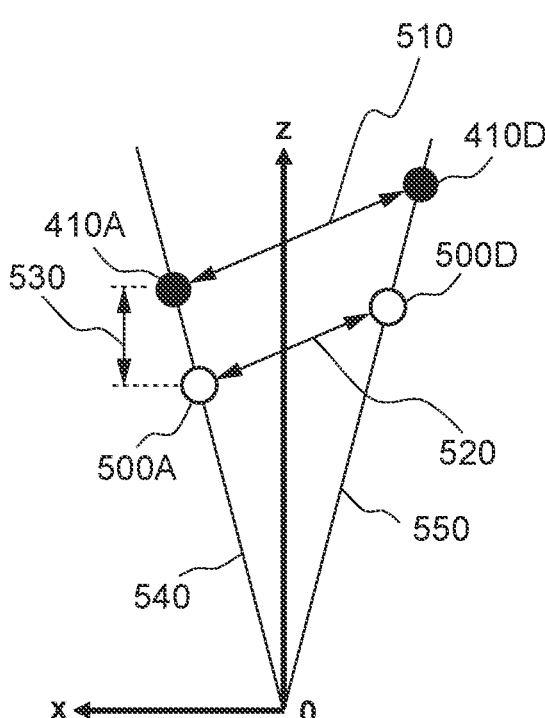
FIG. 5 illustrates calculation processing for a depth correction value.

The correction amount calculation unit 161 sets straight lines 540 and 550 respectively passing through the points 410A and 410D from a camera origin O in the camera coordinate system and sets a length of the line segment 510 connecting the points 410A and 410D as illustrated in FIG. 5.

Next, the correction amount calculation unit 161 estimates three-dimensional points 500A and 500D that are output in a case where there is no error in the camera parameters. The three-dimensional points 500A and 500D are calculated to satisfy following conditions.

(1) The point 500A is on the straight line 540.

(2) The point 500D is on the straight line 550.

(3) A slope of a line segment 520 connecting the points 500A and 500D is the same as a slope of the line segment 510.

(4) A distance between the points 500A and 500D (a length of the line segment 520 connecting the points 500A and 500D) is the same as a side length of the index information.

The correction amount calculation unit 161 sets, for example, a difference 530 in Z value between the point 500A and the point 410A as a correction amount for correcting the depth value (referred to as a depth correction value in the present exemplary embodiment). The correction amount calculation unit 161 uses the index information in this way to calculate the depth correction value using a known length included therein as a correct answer value.

The depth image generation unit 165 calculates the depth value for each pixel from the parallax image stored in the storage unit 130 and adds the depth correction value calculated by the correction amount calculation unit 161 to the depth value. The depth image generation unit 165 generates a depth image with the corrected depth value and outputs it to the image generation unit 170. In this way, the image captured by the image capturing unit 100 can be displayed on the display 180 as the depth image with the corrected depth value.

Figure 6A:
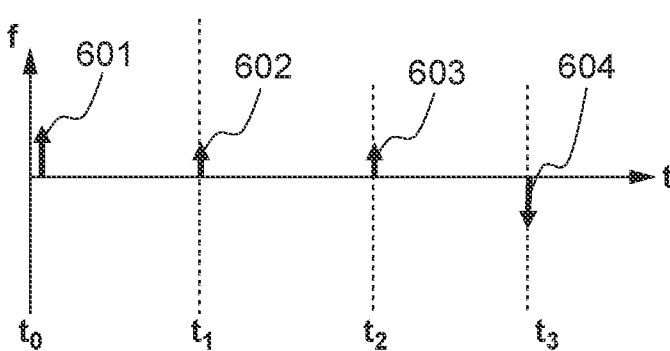
FIGS. 6A to 6C are each a characteristic diagram illustrating examples of depth correction values and depth values.
Figure 6B:
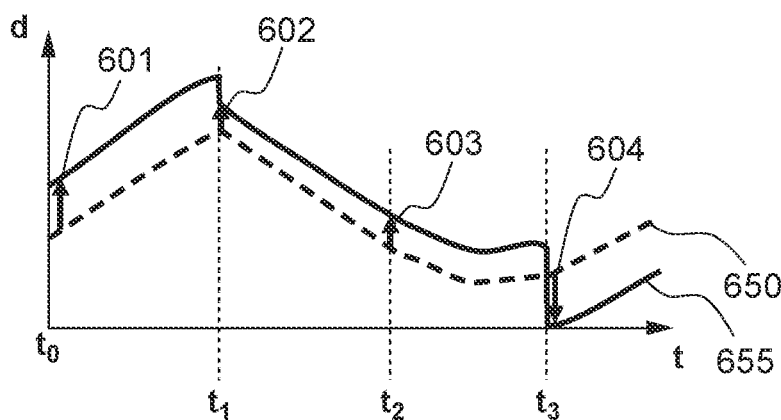

The processing to be performed by the depth correction unit 160 may be executed immediately after the image acquired by the image acquisition unit 110 is updated and the parallax image is generated, or may be executed at a set regular interval. For example, the depth correction value may be calculated each time ten frames of the parallax image are generated. Time-series variations in a case where the depth correction values are calculated at regular intervals are described with reference to FIGS. 6A to 6C. In FIG. 6A, a horizontal axis represents a time t, and a vertical axis represents a depth correction value f. A depth correction value 601 is calculated at an interval from a time t0 to a time t1, and then depth correction values 602, 603, and so on are calculated at regular intervals. In FIG. 6B, the horizontal axis represents the time t, and the vertical axis represents a depth value d. A dotted line 650 indicates uncorrected depth values, and a solid line 655 indicates corrected depth values. As illustrated in FIG. 6B, if the depth correction value f is updated, the depth correction value f is added to the depth value d, and the same depth correction value f is reflected in subsequent frames.

Figure 6C:
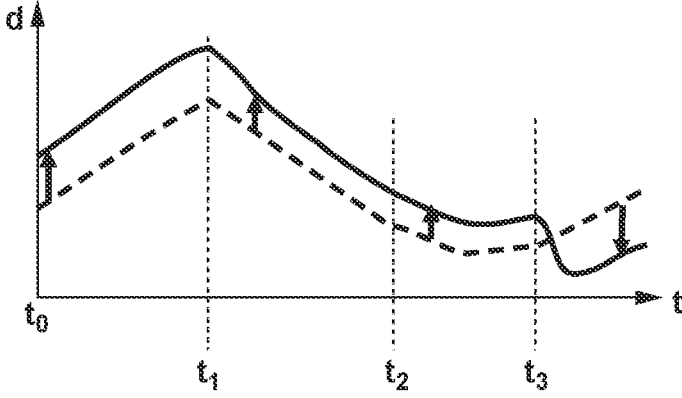

Instead of reflecting the updated depth correction value f without change, a weight may be applied to the depth correction value f. In FIG. 6C, the horizontal axis represents the time t, and the vertical axis represents the depth value d. As illustrated in FIG. 6C, it is possible to control the weight to be increased according to an elapsed time so that the corrected depth value changes smoothly.

Next, processing to be executed by the information processing apparatus 101 is described with reference to FIGS. 2A and 2B. FIG. 2A is a flowchart illustrating the processing to be executed by the information processing apparatus 101. Details of the processing to be executed by each unit are as described above, and a duplicate description thereof is omitted in each step described below.

In step S200, the information processing apparatus 101 acquires the camera parameters from the image capturing unit 100 and stores them in the storage unit 130. The processing is not limited to acquiring the camera parameter from the image capturing unit 100, but a result of calibrating the camera parameter may be stored in advance in the storage unit 130.

In step S210, the image acquisition unit 110 acquires the image captured by the image capturing unit 100.

In step S220, the image correction unit 120 performs the correction processing on the image acquired in step S210 using the camera parameter stored in the storage unit 130 and stores the corrected camera image in the storage unit 130.

In step S230, the parallax image generation unit 140 calculates parallax in the corrected camera image based on the corrected camera image and the camera parameter stored in the storage unit 130 to generate a parallax image and stores the generated parallax image in the storage unit 130.

In step S240, the index detection unit 150 detects the index detection information for the index appearing on the corrected camera image stored in the storage unit 130 and stores the index detection information in the storage unit 130.

In step S250, the depth correction unit 160 executes depth correction processing. The depth correction processing in step S250 is described in detail below with reference to FIG. 2B.

In step S260, the information processing apparatus 101 determines whether a termination condition is satisfied. For example, if a user inputs a termination instruction, the information processing apparatus 101 determines that the termination condition is satisfied. If the information processing apparatus 101 determines that the termination condition is satisfied (YES in step S260), the processing in the present flowchart is terminated. If the information processing apparatus 101 determines that the termination condition is not satisfied (NO in step S260), the processing returns to step S210.

FIG. 2B is a flowchart illustrating details of the depth correction processing in step S250.

In step S251, the depth correction unit 160 acquires the camera parameter, the parallax image, the index detection information, and the index information from the storage unit 130 as information to be used for the depth correction processing.

In step S253, the depth correction unit 160 calculates the depth correction value as described above based on the information acquired in step S251.

In step S255, the depth correction unit 160 generates the depth image by correcting the depth value using the depth correction value calculated in step S253.

As described above, the depth correction unit 160 corrects the depth value based on the index detection information for the index appearing on the image captured by the image capturing unit 100. Thus, if the image of the index is capturable even with a change in the camera parameter in measuring the depth of the scene, the depth value is corrected at that point, so that the depth value with high reproducibility can be acquired even in continuous measurements.

According to the disclosure, the three-dimensional points 500A and 500D in the camera coordinate system can be calculated once, the correction calculation is not to be repeated, unlike the first patent literature. Thus, it is possible to complete the correction calculation within an update time of one frame of an image, and the correction processing does not stop output of a depth value.

The disclosure is not premised on being applied to a mobile object as in the second patent literature, and the depth correction can be executed even in a stationary state. Unlike the second patent literature, without use of images captured at two points, the depth correction value can be calculated from an image captured at one point. The disclosure therefore can also be applied to a stereo camera with a fixed viewpoint.

Since the three-dimensional position of the index is not to be used as the index information to be prepared in advance, the index is not to be fixed in a space and may be moved in a space to be observed. For example, a user can complete the depth correction by simply capturing an image of the index held in his/her hand using the image capturing unit 100 at the timing when he/she wants to correct the depth value. Thus, the configuration for the depth correction is simplified, resulting in eliminating a need for a maintenance knowledge, thus contributing to a reduction in a maintenance cost.

According to the present exemplary embodiment, the example has been described in which the depth correction value is calculated from the information about the adjacent vertices 310A and 310D (the vertices 310E and 310H) in the rectangular area, but the disclosure is not limited to this example. For example, any two vertices may be selected from the four vertices of the rectangular area.

The depth correction value may be calculated using a distance between two vertices of a plurality of combinations selected from the four vertices of the rectangular area. In this case, a plurality of depth correction values is calculated, but, for example, an average value thereof may be used.

In a case where two vertices are selected, it is desirable to select those having a long distance therebetween on the corrected camera image 151L or 151R. This is because if the distance between the two vertices is short on the image, a sampling error occurs in straight line fitting processing used to identify information about the vertices, and the estimated vertices tend to involve an error.

According to the present exemplary embodiment, the example has been described in which the depth value is corrected by calculating the depth correction value, but parallax for calculating the depth value may be corrected. In this case, it is sufficient to calculate the depth value from the corrected parallax, and there is no need to correct the depth value. The parallax can be corrected by calculating a difference in parallax values calculated from the difference 530 of the Z values and adding the difference to the parallax value.

Figure 7:
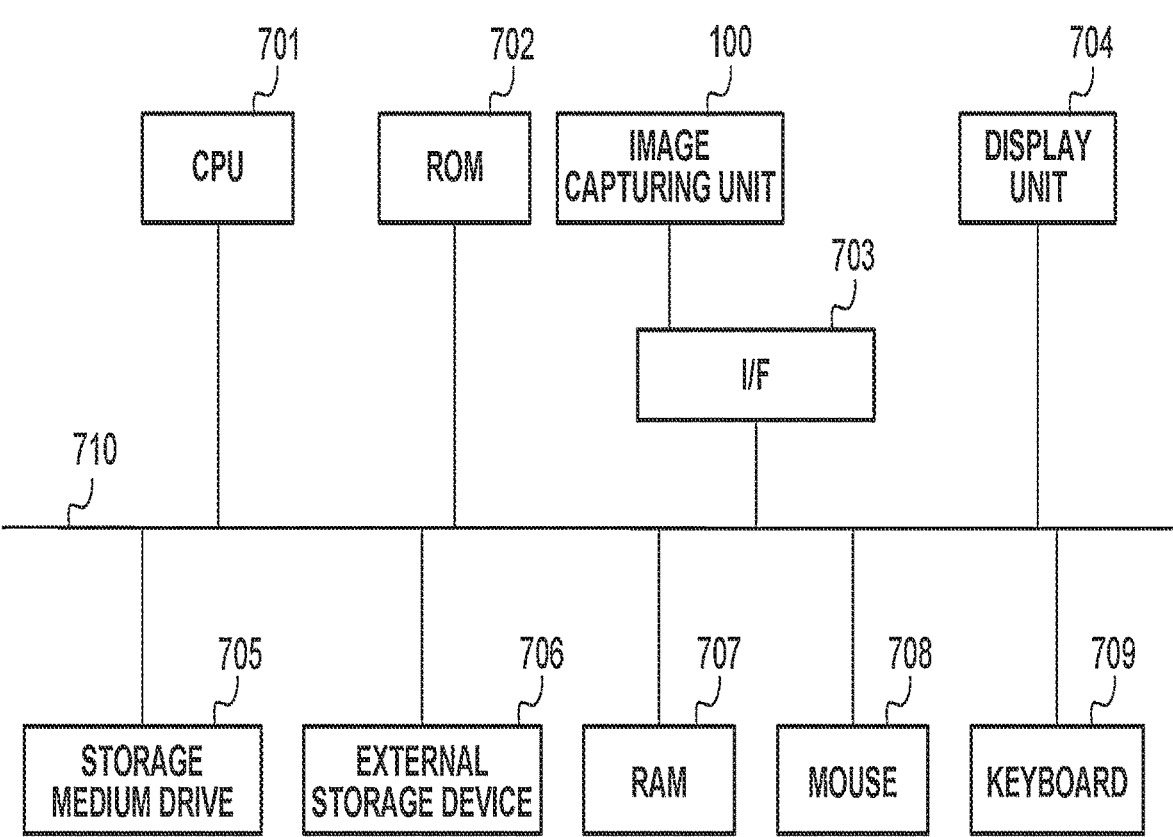
FIG. 7 illustrates an example of a hardware configuration for realizing an information processing apparatus to which the disclosure is applied.

FIG. 7 illustrates an example of a hardware configuration for realizing the information processing apparatus 101 to which the disclosure is applied. A central processing unit (CPU) 701 controls an entire computer using a computer program and data stored in a random access memory (RAM) 707 and a read-only memory (ROM) 702. At the same time, the CPU 701 executes each process, which is described to be performed by the information processing apparatus 101 in each of the following exemplary embodiments. The RAM 707 temporarily stores a computer program and data loaded from an external storage device 706 and a storage medium drive 705. The RAM 707 includes an area for temporarily storing data received from the outside. The RAM 707 further includes a work area used in a case where the CPU 701 executes each process. In other words, the RAM 707 can provide various areas as appropriate. The ROM 702 stores setting data and a boot program of the computer. A keyboard 709 and a mouse 708 are examples of input devices and can input various instructions to the CPU 701 by being operated by a user. A display unit 704 includes a cathode ray tube (CRT) display and a liquid crystal screen and displays a result of processing by the CPU 701 using an image, a character, and the like. For example, the display unit 704 can display an image captured by the image capturing unit 100. The external storage device 706 is a large-capacity information storage device, represented by a hard disk drive device. The external storage device 706 stores an operating system (OS), and a program and data for causing the CPU 701 to execute each process performed by the information processing apparatus 101. The computer program and data stored in the external storage device 706 are appropriately loaded into the RAM 707 under the control of the CPU 701. The CPU 701 executes processing using the loaded program and data, and thus the functions of the information processing apparatus 101 to which the disclosure is applied are realized. The storage medium drive 705 reads a program and data recorded on a storage medium, such as a compact dick (CD)-ROM and a digital versatile disk (DVD)-ROM, and writes a computer program and data to the storage medium. A part or all of the program and data described to be stored in the external storage device 706 may be recorded in the storage medium. The computer program and data read from the storage medium by the storage medium drive 705 are output to the external storage device 706 and the RAM 707. An interface (I/F) 703 includes an analog video port or a digital input/output port of Institute of Electrical and Electronics Engineers (IEEE) 1394 or the like for connecting the image capturing unit 100. Data received via the I/F 703 is input to the RAM 707 and the external storage device 706. A bus 710 connects each of the above-described components with bus signals.

A second exemplary embodiment of the disclosure will be described below. In the second exemplary embodiment, an example will be described in which whether to execute correction of a depth value is determined based on a state of an index appearing on an image captured by an image capturing unit 100. A basic configuration and a processing operation of an image capturing system are similar to those of the first exemplary embodiment. In the following, descriptions of such a basic configuration and a processing operation in common with the first exemplary embodiment are omitted, and a difference from the first exemplary embodiment will be mainly described.

In a case where a depth value is corrected, accuracy of detecting an intersection of an index becomes higher if an image is captured by the index directly facing the image capturing unit 100. If there is a difference in length between two adjacent sides (vertical and horizontal sides) of the rectangular area of the index, the number of samples for straight line fitting to be processed at the time of detecting the rectangular area becomes unequal, and detection of vertices may vary. Thus, the image is captured by the index directly facing the image capturing unit 100 so that the difference in length between the two adjacent sides of the rectangular area is minimized, thus reducing the variation in the detection of the vertices.

Figure 8:
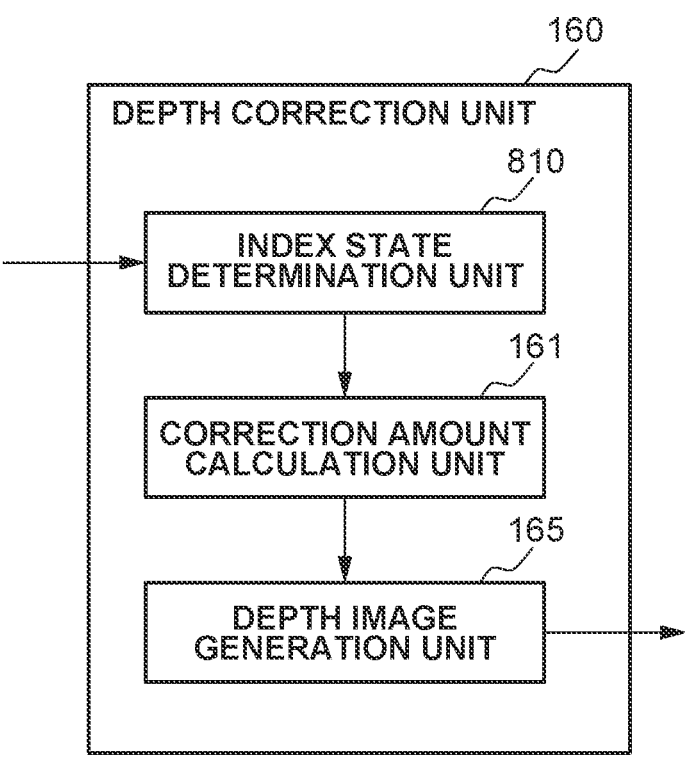
FIG. 8 illustrates a functional configuration of a depth correction unit in an information processing apparatus according to a second exemplary embodiment.

FIG. 8 illustrates a functional configuration of the depth correction unit 160 in the information processing apparatus 101 according to the second exemplary embodiment. In the second exemplary embodiment, the depth correction unit 160 includes an index state determination unit 810, the correction amount calculation unit 161, and the depth image generation unit 165. The index state determination unit 810 determines whether to correct the depth value based on a state of the index appearing on the image captured by the image capturing unit 100.

Figure 10:
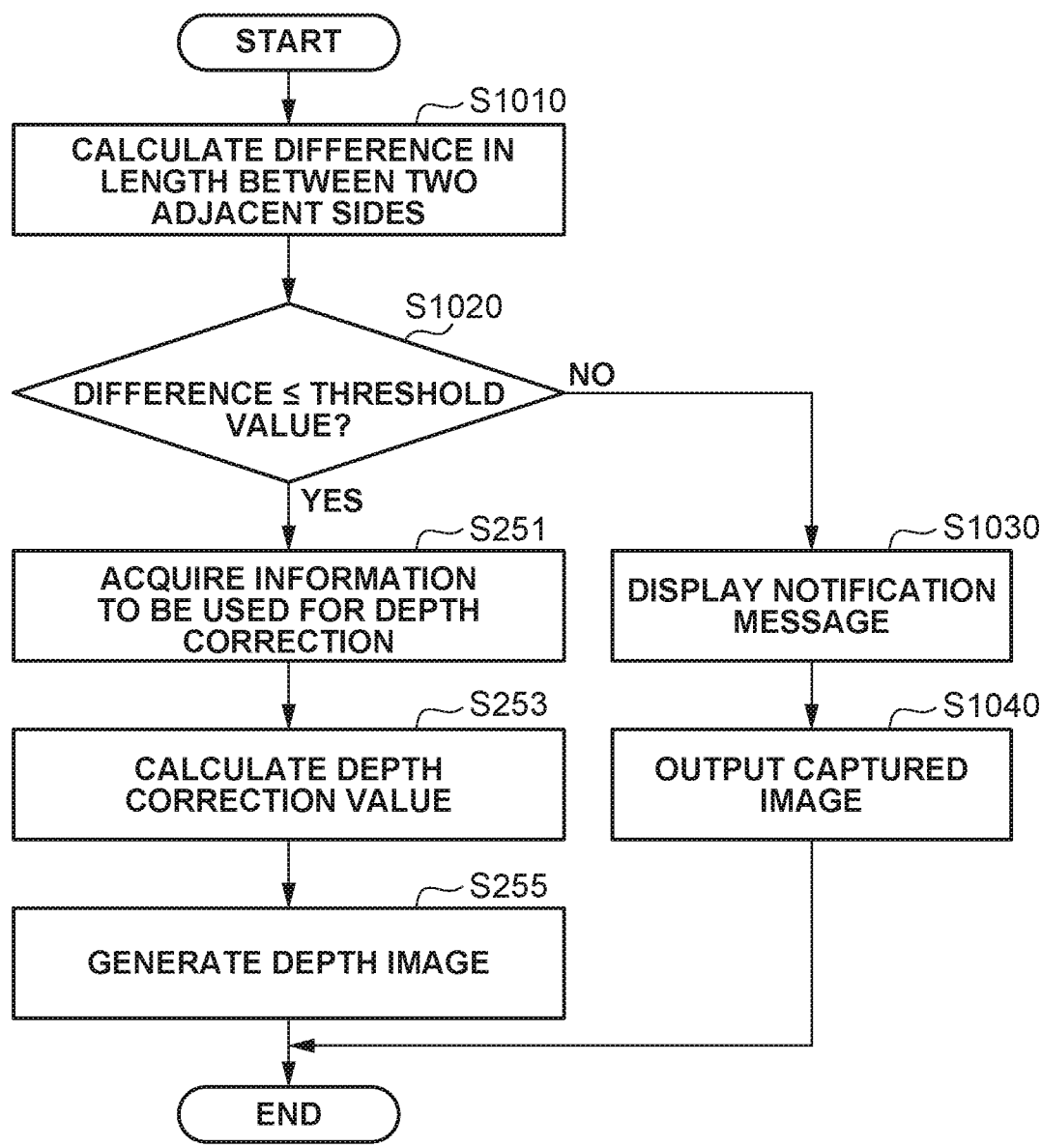
FIG. 10 is a flowchart illustrating processing to be executed by an information processing apparatus according to the second exemplary embodiment.

Next, the processing executed by the information processing apparatus 101 is described with reference to FIGS. 2A and 10. The flowchart in FIG. 2A is common with that in the first exemplary embodiment, and in the present exemplary embodiment, the depth correction processing in step S250 is different from the first exemplary embodiment. FIG. 10 is a flowchart illustrating details of the depth correction processing in step S250.

In step S1010, the index state determination unit 810 acquires the coordinate values of the four vertices of the rectangular area of the index that has an ID of interest in the corrected camera image. The index state determination unit 810 calculates the lengths of the four sides of the rectangular area from the coordinate values of the four acquired vertices and calculates the difference in length between the two adjacent sides.

In step S1020, the index state determination unit 810 determines whether the difference in length between the two adjacent sides calculated in step S1010 is less than or equal to a predetermined threshold value. In other words, the index state determination unit 810 determines whether the index is in a state in which the variation in the detection of the vertices is controlled such that the difference in length between the two adjacent sides is minimized. If the index state determination unit 810 determines that the difference is less than or equal to the predetermined threshold value (YES in step S1020), the index state determination unit 810 advances the processing to step S251. If the index state determination unit 810 determines that the difference exceeds the predetermined threshold value (NO in step S1020), the index state determination unit 810 advances the processing to step S1030.

In step S1030, the index state determination unit 810 acquires the corrected camera image stored in the storage unit 130 and synthesizes the corrected camera image with a notification message prompting a user to face the index and a guide frame indicating an appropriate position of the index on the image.

Figure 9:
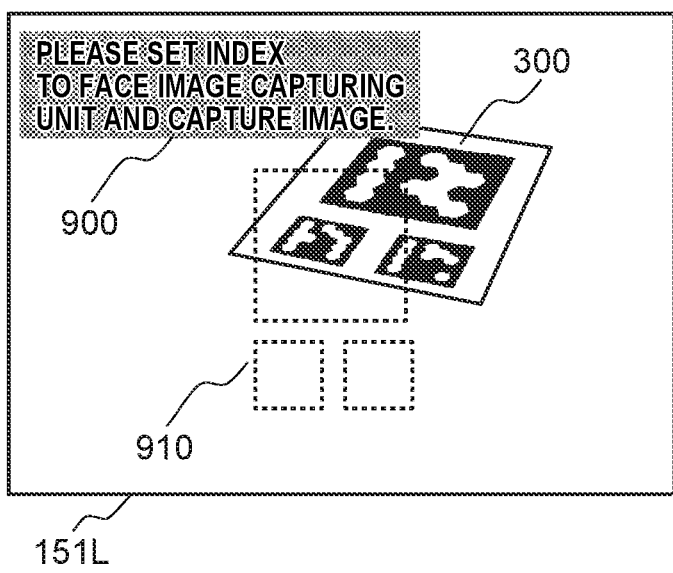
FIG. 9 illustrates a display example of an image according to the second exemplary embodiment.

In step S1040, the information processing apparatus 101 outputs the corrected camera image synthesized with the notification message and the guide frame in step S1030 to the image generation unit 170. Thus, as illustrated in FIG. 9, the image captured by the image capturing unit 100 can be synthesized with a notification message 900 and a guide frame 910 and displayed on the display 180.

As described above, the information processing apparatus 101 executes correction of the depth value in a case where the index appearing on the image captured by the image capturing unit 100 is in a desirable state and thus can reduce the variation in the detection of the vertices of the rectangular area and prevent degradation of the accuracy of depth measurement.

A third exemplary embodiment of the disclosure will be described below. According to the third exemplary embodiment, an example will be described in which whether to execute correction of a depth value is determined based on a relative stationary state between an image capturing unit 100 and an index. A basic configuration and a processing operation of an image capturing system are similar to those according to the first exemplary embodiment. In the following, descriptions of such a basic configuration and a processing operation in common with those in the first exemplary embodiment are omitted, and a difference from the first exemplary embodiment will be mainly described.

According to the third exemplary embodiment, a relative stationary state between the image capturing unit 100 and the index is determined in order to detect a vertex of a rectangular area of the index, and a median value of coordinate values of the same vertex over a plurality of frames from a corrected camera image in the stationary state is used as the coordinate values of the vertex.

Figure 11:
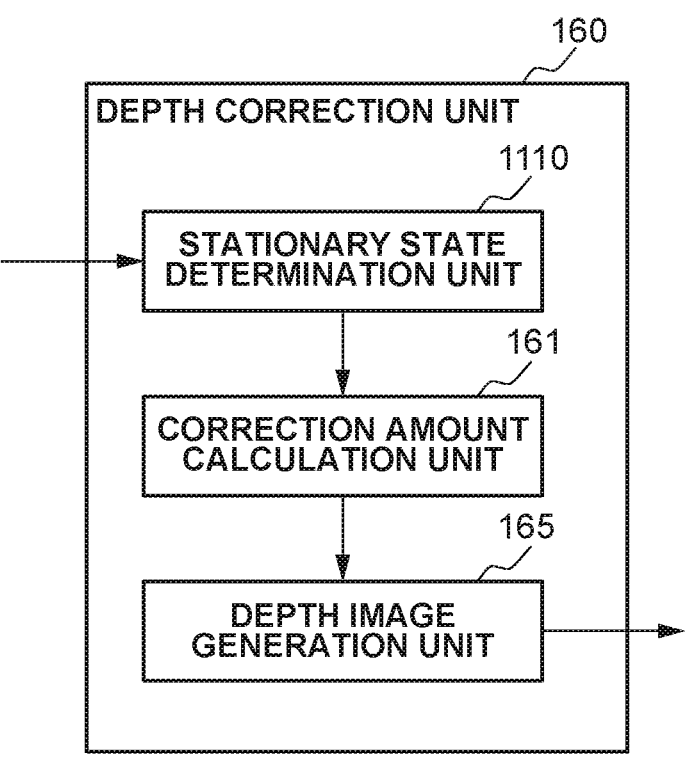
FIG. 11 illustrates a functional configuration of a depth correction unit in an information processing apparatus according to a third exemplary embodiment.

FIG. 11 illustrates a functional configuration of the depth correction unit 160 in the information processing apparatus 101 according to the third exemplary embodiment. According to the third exemplary embodiment, the depth correction unit 160 includes a stationary state determination unit 1110, the correction amount calculation unit 161, and the depth image generation unit 165. The stationary state determination unit 1110 determines whether to execute correction of the depth value based on the relative stationary state between the image capturing unit 100 and the index.

Figure 13:
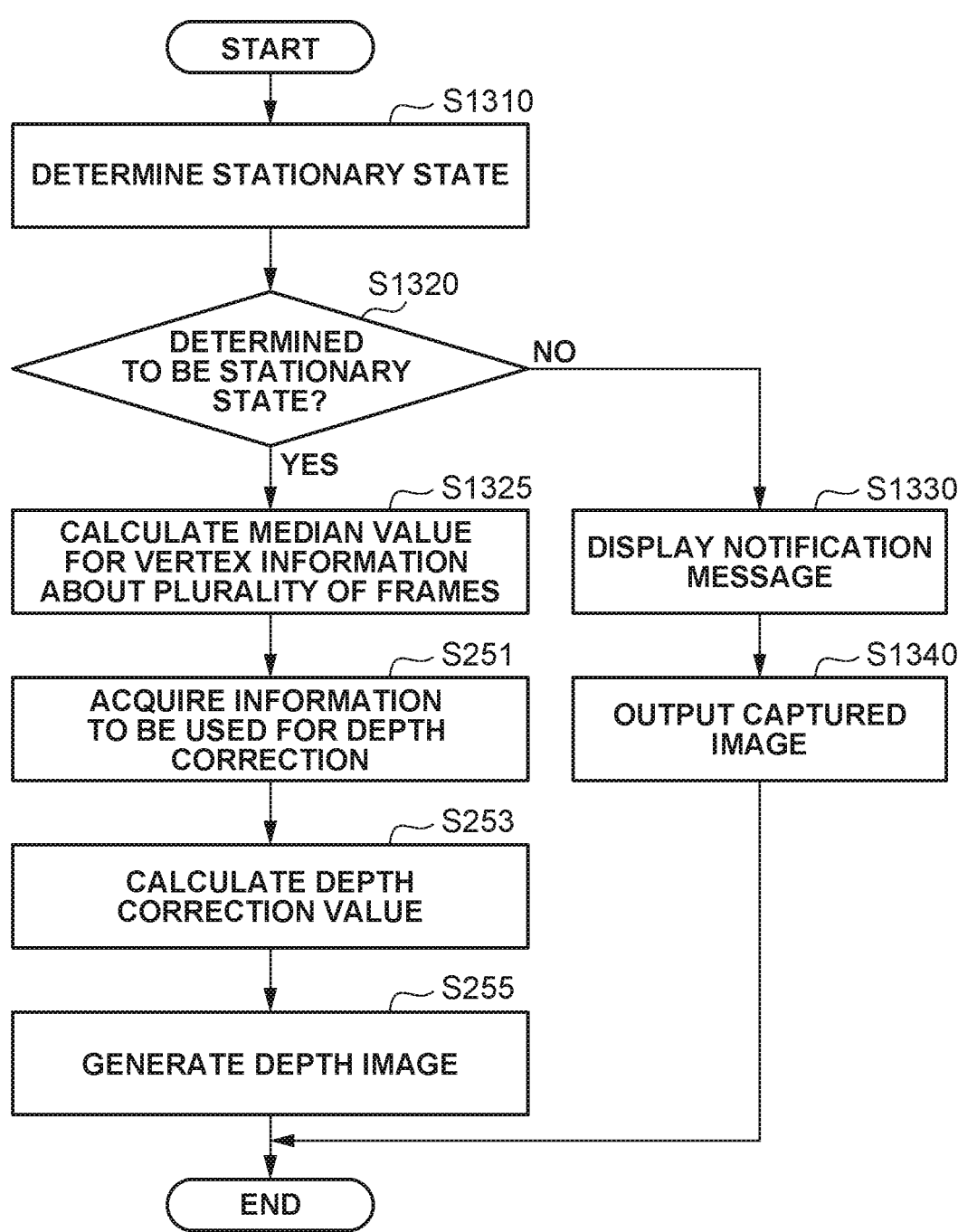
FIG. 13 is a flowchart illustrating processing to be executed by the information processing apparatus according to the third exemplary embodiment.

Next, the processing to be executed by the information processing apparatus 101 will be described with reference to FIGS. 2A and 13. The flowchart in FIG. 2A is common with that in the first exemplary embodiment, and in the present exemplary embodiment, the depth correction processing in step S250 is different from the first exemplary embodiment. FIG. 13 is a flowchart illustrating details of the depth correction processing in step S250.

In step S1310, the stationary state determination unit 1110 determines the relative stationary state between the image capturing unit 100 and the index. More specifically, the stationary state determination unit 1110 acquires the past index detection information stored in the storage unit 130 and acquires the coordinate values of two vertices of the rectangular area of the index that has the ID of interest in each frame. The stationary state determination unit 1110 calculates an amount of movement of two vertices between frames. The amount of movement in each frame of the one vertex is obtained by calculating a differential value of the X and Y coordinates between frames. If the amount of movement exceeds a predetermined threshold value in all frames, it is determined that the vertex moves.

In step S1320, if the stationary state determination unit 1110 determines that the index is in the stationary state in step S1310 (YES in step S1320), the stationary state determination unit 1110 advances the processing to step S1325. If the stationary state determination unit 1110 determines that the index is not in the stationary state (NO in step S1320), the stationary state determination unit 1110 advances the processing to step S1330.

In step S1325, the stationary state determination unit 1110 changes the coordinate values of the index detection information acquired from the storage unit 130 in step S251 so that the median value of the coordinate values of the two vertices of interest in the past index detection information among a plurality of frames is to be used.

In step S1330, the stationary state determination unit 1110 acquires the corrected camera image stored in the storage unit 130 and synthesizes the corrected camera image with a notification message prompting a user to put the index in the stationary state.

Figure 12:
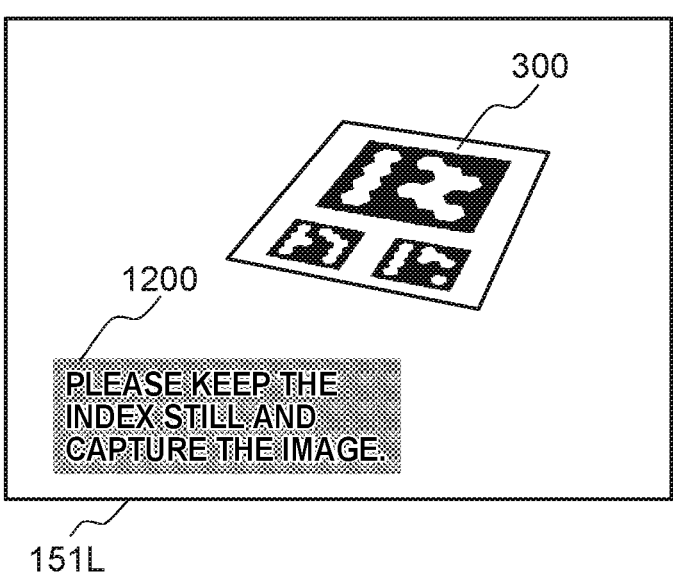
FIG. 12 illustrates a display example of an image according to the third exemplary embodiment.

In step S1340, the information processing apparatus 101 outputs the corrected camera image synthesized with the notification message in step S1330 to the image generation unit 170. Thus, the image captured by the image capturing unit 100 can be synthesized with a notification message 1200 and displayed on the display 180 as illustrated in FIG. 12.

As described above, the information processing apparatus 101 executes depth correction in a case where the image capturing unit 100 and the index are in the relative stationary state, thus executing the depth correction with high detection accuracy of the vertices of the rectangular area.

The present exemplary embodiment has been described based on the first exemplary embodiment, but may be combined with the second exemplary embodiment. In such a case, facing determination as to whether the index directly faces the image capturing unit 100 is made in steps S1010 and S1020, and if it is determined that the index faces the image capturing unit 100, the stationary state determination in step S1310 may be performed. In a case where each determination does not result in YES, the notification message corresponding to each determination may be displayed (in step S1030 or S1330).

A fourth exemplary embodiment of the disclosure will be described below. According to the fourth exemplary embodiment, an example is described in which a first image capturing unit that captures images from a plurality of directions and a second image capturing unit that captures images from a plurality of directions and has a time variation in a camera parameter smaller than that of the first image capturing unit are fixed to each other, and index information is detected from an image captured by the second image capturing unit. A basic configuration and a processing operation of an image capturing system are similar to those according to the first exemplary embodiment. In the following, descriptions of such a configuration and a processing operation in common with those in the first exemplary embodiment are omitted, and a difference from the first exemplary embodiment will be mainly described.

Figure 14:
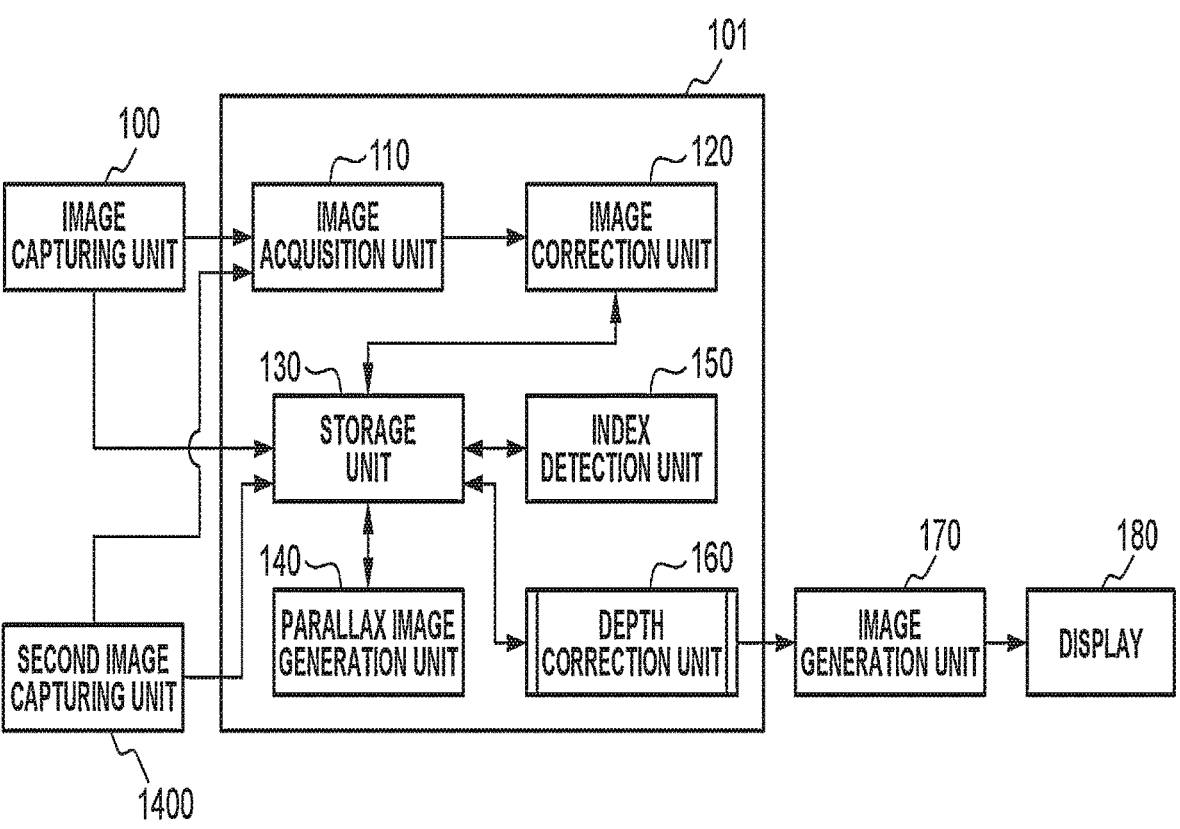
FIG. 14 illustrates a functional configuration of an image capturing system according to a fourth exemplary embodiment.

FIG. 14 illustrates a functional configuration of the image capturing system according to the fourth exemplary embodiment. The image capturing system includes the image capturing unit 100, which is the first image capturing unit, a second image capturing unit 1400, the information processing apparatus 101, the image generation unit 170, and the display 180, and the image capturing unit 100 and the second image capturing unit 1400 are fixed to each other.

As a factor of a time variation in the camera parameter, it is conceivable that a relative position and orientation of an image receiving sensor and a lens may slightly change due to temperature, impact, or the like. In particular, a camera with a small area of the image receiving sensor and a small lens area is easily affected by a variation amount of the lens for one pixel of the image receiving sensor, so that the time variation in the camera parameter becomes large. In contrast, even if the image receiving sensor has the same number of pixels, a camera with a large area of the image receiving sensor and a large lens area is less affected by a minute change, so that the time variation in the camera parameter is small.

According to the present exemplary embodiment, the second image capturing unit 1400 is configured with a large image receiving sensor and lens, and the time variation in the camera parameter is small compared with the image capturing unit 100. For example, the image capturing unit 100 is a small color camera that presents an image to a user. The second image capturing unit 1400 is a gray scale camera that estimates a position and orientation of the image capturing unit 100 by simultaneous localization and mapping (SLAM). In the second image capturing unit 1400, the image receiving sensor has a large area in order to stably estimate the position and orientation even in a dark place, and the time variation in the camera parameter is small. The image capturing unit 100 and the second image capturing unit 1400 are fixed to each other and assumed as a device that is worn on a user's head or the like and realizes augmented reality (AR) that displays a computer graphics (CG) image synthesized with a video of the image capturing unit 100 while the position and orientation of the user's head is being measured.

The image acquisition unit 110, the image correction unit 120, the storage unit 130, and the index detection unit 150 in the information processing apparatus 101 process the image captured by the second image capturing unit 1400 in a manner similar to the image captured by the image capturing unit 100. Each block may be configured to perform processing on the image capturing unit 100 and the second image capturing unit 1400 in parallel or may be configured to perform processing sequentially by time division.

According to the present exemplary embodiment, the information stored in the storage unit 130 is different in following points compared with the first exemplary embodiment.

The information to be added to storage unit 130:

The corrected camera image of the second image capturing unit 1400 (left and right images in a case of a twin-lens stereo camera)

The camera parameters of the second image capturing unit 1400 (external camera parameters such as a relative position and orientation between the stereo cameras and internal camera parameters such as a focal length and a principal point position of each stereo camera)

The index detection information detected by the index detection unit 150 from the corrected camera image captured by the second image capturing unit 1400 (an ID of the index and coordinate values <X value, Y value> of vertices of the rectangular area of each index)

The past index detection information detected from the corrected camera image captured by the second image capturing unit 1400 (e.g., the index detection information corresponding to the last ten frames)

The information of the storage unit 130 which is different from the first exemplary embodiment:

The index information (information generated based on the index detection information detected from the corrected camera image captured by the second image capturing unit 1400, such as the ID as the identification information of the index, and the lengths of sides of the rectangular area)

As described above, since the index information is generated based on the index detection information about the second image capturing unit 1400, there is a beneficial effect that a user does not need to prepare the index information in advance by, for example, inputting it.

It is indicated that the index detection information about the second image capturing unit 1400 is used as a correct answer value (the length of the side of the rectangular area) at the time of calculating the depth correction value by the depth correction unit 160.

Calculation processing of the depth correction value by the depth correction unit 160 can be realized by the same processing as that in the first exemplary embodiment, except that the index information generated from the index detection information of the second image capturing unit 1400 is referred to.

The processing executed by the information processing apparatus 101 is also the same as that according to the first exemplary embodiment, so that the description thereof is omitted.

As described above, even if the index information is not prepared in advance, the depth correction value can be calculated using the index detection information acquired from the image capturing unit with a small time variation in the camera parameter as the correct answer value.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-202355, filed Dec. 14, 2021, which is hereby incorporated by reference herein in its entirety.

15

What is claimed is:

1. An image capturing system comprising:

a first stereo camera including a plurality of cameras;

a second stereo camera including a plurality of cameras and having a time variation in a camera parameter smaller than that of the first stereo camera;

a processor; and a memory coupled to the processor and storing instructions that, when executed by the processor, cause the processor to function as:

an image acquisition unit configured to acquire first images captured by the first stereo camera and second images captured by the second stereo camera;

an index detection unit configured to detect first information about an index appearing on the first images and second information about the index appearing on the second images; and a correction unit configured to correct parallax in the first images acquired by the image acquisition unit, or to correct a depth value calculated from the corrected parallax, based on the first information and the second information, wherein the first information comprises a three-dimensional distance between two points included in the index calculated based on triangulation using the first images, and the second information comprises a three-dimensional distance between two points included in the index calculated based on triangulation using the second images, and the correction unit uses the second information as a correct answer value.

2. The image capturing system according to claim 1, wherein the processor further functions as a calculation unit configured to calculate the depth value from the corrected parallax.

3. The image capturing system according to claim 1, wherein the first stereo camera is a color camera.

4. The image capturing system according to claim 3, wherein the second stereo camera is a gray scale camera.

5. The image capturing system according to claim 3, wherein the first stereo camera is a camera that presents an image to a user.

6. The image capturing system according to claim 4, wherein the second stereo camera is a camera that estimates a position and orientation by simultaneous localization and mapping (SLAM).

7. The image capturing system according to claim 1, wherein an image receiving sensor of the second stereo camera is larger than an image receiving sensor of the first stereo camera.

8. The image capturing system according to claim 7, wherein a lens of the second stereo camera is larger than a lens of the first stereo camera.

* * * * *